United States Patent
Kayanoki et al.

(10) Patent No.: US 6,440,568 B1
(45) Date of Patent: *Aug. 27, 2002

(54) PLASTIC LENSES AND PRIMER COMPOSITION USED FOR COATING THE SAME

(75) Inventors: Hisayuki Kayanoki; Fujio Sawaragi, both of Ichihara (JP)

(73) Assignee: Nippon Arc Co., Ltd., Chiba (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/230,224

(22) PCT Filed: May 26, 1998

(86) PCT No.: PCT/JP98/02301

§ 371 (c)(1),
(2), (4) Date: Jan. 22, 1999

(87) PCT Pub. No.: WO98/54604

PCT Pub. Date: Dec. 3, 1998

(30) Foreign Application Priority Data

May 27, 1997 (JP) ............................................... 9-137016

(51) Int. Cl.[7] ............................................... B32B 27/40
(52) U.S. Cl. ................................ 428/425.9; 428/423.1; 428/423.3; 428/425.5; 528/73; 528/83; 523/457; 523/460
(58) Field of Search ........................... 428/423.1, 423.3, 428/425.5, 425.9; 528/73, 83; 523/435, 457, 458, 459, 460, 455

(56) References Cited

U.S. PATENT DOCUMENTS

| 4,692,384 A | * | 9/1987 | Pedain et al. ............. 428/423.3 |
| 5,310,577 A | | 5/1994 | Mase et al. ................. 427/164 |
| 5,963,373 A | * | 10/1999 | Kayanoki ................... 359/581 |

FOREIGN PATENT DOCUMENTS

| JP | 1-240576 | | 9/1989 |
| JP | 3-109502 | | 5/1991 |
| JP | 3-166277 | | 7/1991 |
| JP | 6-51104 | | 2/1994 |
| JP | 6-118203 | | 4/1994 |
| JP | 6-337376 | | 12/1994 |
| JP | 7-18169 | | 1/1995 |
| JP | 7-84101 | | 3/1995 |
| JP | 7-62722 | | 7/1995 |
| JP | 8-224534 | | 9/1996 |
| JP | 8-325347 | | 12/1996 |
| JP | WO97/10306 | * | 3/1997 |
| JP | 9-136978 | | 5/1997 |

* cited by examiner

*Primary Examiner*—Blaine Copenheaver
*Assistant Examiner*—Christopher Paulraj
(74) *Attorney, Agent, or Firm*—Wenderoth, Lind & Ponack, LLP

(57) ABSTRACT

A plastic lens having a primer layer made from a polyurethane resin obtained through a reaction between a polyester polyol containing isophthalic acid as a main component and a polyisocyanate.

A plastic lens having excellent resistance to scratch and impact resistance can be obtained by further forming a hard-coat layer and an anti-reflection layer on the primer layer.

15 Claims, No Drawings

PLASTIC LENSES AND PRIMER COMPOSITION USED FOR COATING THE SAME

TECHNICAL FIELD

The present invention relates to a plastic lens and a primer composition for coating the same.

BACKGROUND ART

A plastic lens has a silicon-based or other hard-coating or ultraviolet light-cured film on the surface thereof because it easily receives a scratch. An anti-reflection film may be further formed on the plastic lens by vapor-depositing an inorganic material to suppress reflection on the surface of the plastic lens. Such a lens has defects in that its impact resistance is low and is cracked in a falling ball impact test (FDA standards of USA).

To solve this problem, there is known a technology for forming a primer layer of an urethane resin between a lens substrate and a hard coat.

JP-A 5-25299 discloses a process for producing a plastic lens that comprises coating a primer coating comprising a blocked polyisocyanate blocked with β-diketone and a polyol as main components, on the surface of a plastic lens substrate; curing it by heating to form a primer layer of a thermosetting polyurethane; forming a hard layer; and forming a single-layer or multi-layer anti-reflection film on the surface of the hard layer by vapor-depositing an inorganic material.

JP-B 7-62722 discloses a plastic lens which is produced by laminating a primer layer having a thickness of 0.01 to 30 μm, which is formed by coating and heating a polyurethane resin solution obtained from diisocyanate and at least one diol selected from the group consisting of alkylene glycol, polyalkylene glycol, poly(alkyleneadipate), poly-ε-caprolactones, polybutadienes, poly(alkylenecarbonate) and silicone polyol), a silicon-based resin cured layer, and a single-layer or multi-layer anti-reflection film formed by vapor depositing an inorganic material, in this order on a plastic lens made mainly from a terpolymer of diethylene glycol bisallyl carbonate, diallyl phthalate and benzyl methacrylate.

The above prior arts involve the following problems.
(1) Although spectacle lenses are used in temperate districts of 30° C. and even in cold districts of 0° C., an urethane primer prepared from a polyester polyol comprising adipic acid as a main component in particular is inferior in impact resistance at high temperatures, and may not achieve sufficient impact resistance in some cases.
(2) Of lenses having a high refractive index (HI lenses), there is a lens having low impact resistance. A lens having higher impact resistance is demanded.

It is therefore an object of the present invention to provide a plastic lens having high impact resistance, in spite of having an anti-reflection film, in various environments and a primer for the plastic lens.

It is another object of the present invention to provide a plastic HI lens having effective impact resistance and a primer for the plastic lens.

Other objects and advantages of the present invention will become apparent from the following description.

DISCLOSURE OF THE INVENTION

According to the present invention, firstly, the above objects and advantages of the present invention can be attained by a plastic lens comprising a plastic lens substrate and a polyurethane layer formed on at least one side of the substrate, particularly preferably on a concave surface side, characterized in that the polyurethane layer is a cured product of a primer (to be referred to as "primer-cured layer" hereinafter) comprising a polyester polyol which contains, as an acid component, isophthalic acid in an amount of at least 50 mol % based on the total of all acid components and other dicarboxylic acid in an amount of 50 molt or less based on the total of all acid components and a polyisocyanate as main components.

A description is first given of the primer-cured layer.
(a) Primer-cured Layer

An urethane resin comprising a polyester polyol containing isophthalic acid as a main component has higher impact resistance at a wide temperature range experienced in a daily life than a conventional urethane resin comprising a polyester polyol containing adipic acid as a main component. Particularly, the impact resistance of the former does not degrade at high temperatures. The urethane resin provides an HI lens substrate which is slightly inferior in impact resistance, with sufficiently high impact resistance for practical use.

The primer that forms the primer-cured layer in the present invention comprises a polyester polyol and a polyisocyanate as main components.
(1) Polyester Polyol The polyester polyol is a polyester which comprises isophthalic acid in an amount of at least 50 mol % of the total of all acid components and other dicarboxylic acid in an amount of 50 mol % or less based on the total of all acid components, and which has a hydroxyl group at terminals of the molecule.

Illustrative examples of the other dicarboxylic acid which is to be contained in an amount of 50 mol % or less include phthalic acid, terephthalic acid, phthalic anhydride, hydrogenated phthalic acid, fumaric acid, dimerized linoleic acid, maleic acid and saturated aliphatic dicarboxylic acids having 4 to 8 carbon atoms. They may be used alone or in combination of two or more.

As the hydroxyl compound may be used a compound which is widely used for the synthesis of a polyester polyol, as exemplified by compounds represented by the following general formula (1):

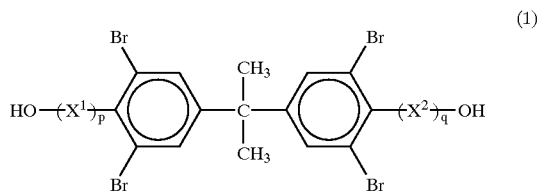

(1)

wherein $X^1$ is —$CH_2CH_2O$— or

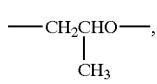

$X^2$ is —$OCH_2CH_2$— or

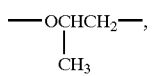

and p and q are independently an integer of 1 to 3, and the following general formula (2):

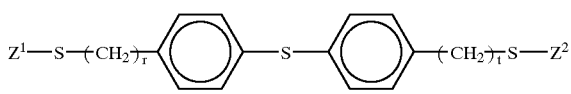

(2)

wherein $Z^1$ and $Z^2$ are independently an organic group having one OH group and comprising a carbon atom, hydrogen atom and oxygen atom, and r and t are independently 0 or 1.

Illustrative examples of the polyol include diols such as ethylene glycol, diethylene glycol, polyethylene glycol, propylene glycol, polypropylene glycol, butanediol, hexanediol, methyl pentanediol, neopentyl glycol and an adduct of bisphenol A with ethylene oxide or with propylene oxide; and polyols having three or more hydroxyl groups such as trimethylol propane, glycerin, trimethylol ethane and pentaerythritol.

Typical examples of the compound represented by the above formula (1) are a bromide of an adduct of bisphenol A with ethylene oxide or propylene oxide, and typical examples of the compound represented by the above formula (2) are 4,4'-thiobisbenzenethiol and 4,4'-thiobisbenzylthiol.

The above hydroxyl compounds may be used alone or in combination of two or more.

(2) Polyisocyanate

As the polyisocyanate may be used any of a polyisocyanate having a saturated aliphatic skeleton and one having an aromatic ring skeleton. These polyisocyanates may be used in the form of a monomer, isocyanurate, allophanate, burette, carbodiimide, adduct, modified product or prepolymer.

Illustrative examples of the polyisocyanate having a saturated aliphatic skeleton include hexamethylene diisocyanate, 1,3,3-trimethyl hexamethylene diisocyanate, isophorone diisocyanate, 4,4'-dicyclohexylmethane diisocyanate, hydrogenated xylylene diisocyanate and hydrogenated diphenylmethane diisocyanate.

Illustrative examples of the polyisocyanate having an aromatic ring skeleton include xylylene diisocyanate, tetramethylxylylene diisocyanate, tolylene diisocyanate, diphenylmethane diisocyanate, 1,5-naphthalene diisocyanate and tetramethylxylylene diisocyanate.

(3) Blocking Agent

The isocyanate group (—N=C=O) of the polyisocyanate may be blocked by a blocking agent.

Illustrative examples of the blocking agent include β-diketone, diethyl malonate, dimethyl malonate, acetoxime, methyl ethyl ketoxime, butanone oxime, acetylacetone, 2,4-hexanedione, 3,5-heptanedione and caprolactam.

In the present invention, when the polyisocyanate is hexamethylene diisocyanate, it is in the form of an isocyanurate of hexamethylene diisocyanate and the isocyanate group thereof is preferably blocked by at least one compound selected from the group consisting of β-diketone, diethyl malonate, dimethyl malonate, acetoxime and butanone oxime.

Similarly, when the polyisocyanate is xylylene diisocyanate or teteramethylxylylene diisocyanate, the isocyanate group is preferably blocked by at least one compound selected from the group consisting of β-diketone, diethyl malonate, dimethyl malonate, acetoxime and butanone oxime.

The primer in the present invention comprises the above polyester polyol and polyisocyanate as main components, and may contain other polyol as required.

(4) Other Polyol

Other polyol may be added to the primer to adjust the physical properties of its cured product. As the other polyol may be used polycarbonate polyols (Nipporan 980 series of Nippon Polyurethane Co., Ltd., or Carbodiol of Toagosei Co., Ltd.), polyether polyols (Adecapolyether of Asahi Denka Kogyo K.K., Actocall of Takeda Chemical Industries, Ltd., PPG-Diol series of Mitsui Toatsu Chemical Co., Ltd.) and acryl polyols (Takerack of Takeda Chemical Industries, Ltd., Acridic of Dainippon Ink and Chemicals, Inc.).

The other polyol is used preferably in an amount of 50 put or less by weight, more preferably 30 parts or less by weight, based only on 100 parts by weight of the polyester polyol.

In general, it is preferred that the primer in the present invention contains a polyester polyol or a combination of a polyester polyol and other polyol in such an amount that the isocyanate group of the polyisocyanate is to be 0.7 to 1.5 equivalents based on one equivalent of the hydroxyl group of the polyester polyol or the total of the hydroxyl groups of the polyester polyol and other polyol.

The primer in the present invention may contain fine particles of a specific metal oxide.

(5) Fine Particles of Metal Oxide

The refractive index of the primer-cured layer can be increased by containing fine particles of a specific metal oxide in the primer. The fine particles are prepared from an oxide of at least one metal atom selected from the group consisting of Si, Al, Sn, Sb, Ta, Ce, La, Fe, Zn,.W, Zr, In and Ti, and have an average particle diameter of 1 to 100 nm.

To contain the fine particles in the primer, it is preferred to use a sol prepared by dispersing the fine particles in an organic solvent.

The content of the fine particles in the primer is preferably 70 wt % or less, more preferably 10 to 60 wt %, in terms of solid content.

The primer in the present invention is generally prepared in an organic solvent.

(6) Organic Solvent

The organic solvent is preferably a glycol or ketone.

Illustrative examples of the glycol include ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, ethylene glycol dimethyl ether, ethylene glycol diethyl ether, ethylene glycol dipropyl ether, ethylene glycol dibutyl ether, diethylene glycol dimethyl ether, diethylene glycol diethyl ether, diethylene glycol dipropyl ether, diethylene glycol dibutyl ether, propylene glycol dimethyl ether, propylene glycol diethyl ether, propylene glycol monomethyl ether, propylene glycol monoethyl ether, polypropylene glycol monobutyl ether, ethylene glycol monoethyl ether, ethylene glycol monopropyl ether, ethylene glycol monobutyl ether and the like.

Illustrative examples of the ketone include cyclohexanone, o-methylcyclohexanone, m-methylcyclohexanone, p-methylcyclohexanone acetone, methyl ethyl ketone and the like.

Besides these, diacetone alcohol may be used.

The above organic solvents may be used alone or in combination of two or more.

Acetates, solvent naphtha, alcohols and the like may be further added as required.

The acetates include ethyl acetate, butyl acetate and the like.

The organic solvent is used in such an amount that provides a primer which preferably has a solid content of 5 to 50 wt %.

The primer in the present invention may contain a curing catalyst for a polyurethane-formation reaction as required.

(7) Curing Catalyst

To cause an urethane-formation reaction, an fatty acid metal salt or amine may be added, though it is not always necessary, as a curing catalyst.

The fatty acid metal salt is a stearate or octylate of a metal such as tin, zinc, cobalt, iron, aluminum or the like.

The amine is an aliphatic amine, aromatic amine or aminosilane. Specific examples of the amine include polymethylene diamine, polyether diamine, diethylene triamine, iminobispropylamine, bishexamethylene triamine, diethylene triamine, tetraethylene pentaamine, pentaethylene hexaamine, pentaethylene hexamine, dimethylaminopropylamine, aminoethyl ethanol amine, methyliminobispropylamine, menthane diamine, N-aminomethylpiperazine, 1,3-diaminocyclohexane, isophorone diamine, metaxylene diamine, tetrachloroparaxylene diamine, methaphenilene diamine, 4,4'-methylene dianiline, diaminodiphenyl sulfone, benzidine, toluidine, diaminodiphenyl ether, 4,4'-thiodianiline, 4,4'-bis(o-toluidine)dianisidine, o-phenylenediamine, 2,4-toluenediamine, methylenebis(o-chloroaniline), diaminiditolylsulfone, bis(3,4-diaminophenyl)sulfone, 2,6-diaminopyridine, 4-chloro-o-phenylenediamine, 4-methoxy-6-methyl-m-phenylenediamine, m-aminobenzylamine, N,N,N',N'-tetramethyl-1,3-butanediamine, N,N,N', N'-tetramethyl-p-phenylenediamine, tetramethylguanidine, triethanolamine, 2-dimethylamino-2-hydroxypropane, N, N'-dimethylpiperazine, N,N'-bis[(2-hydroxy)propyl] piperazine, N-methylmorpholine, hexamethyleneytetramine, pyridine, pyrazine, quinoline, benzyldimethylamine, α-methylbenzylmethylamine, 2-(dimethylaminomethyl)phenol, 2,4,6-tris (dimethylaminomethylol)phenol, N-methylpiperazine, pyrrolidine, morpholine, N-β(aminoethyl) γ-aminopropyl trimethoxysilane, γ-aminopropyltrimethoxysilane, γ-aminopropyl triethoxysilane, N-β(aminoethyl) γ-aminopropylmethyl dimethoxysilane, γ-aminopropylmethyl dimethoxysilane, γ-aminopropylmethyl diethoxysilane and the like.

Further, as the curing catalyst may be used ammonium acetate, quarternaryammonium alkyl acetate, trifluoroacetic acid, paratoluenesulfonic acid, and salts thereof.

The primer in the present invention may further contain a leveling agent for the cured layer (coating film), antioxidant, weatherability-providing agent, antistatic agent, bluing agent, colorant, dye and the like. Of these, the leveling agent is preferably a copolymer of polyoxyalkylene and polydimethylsiloxane or a copolymer of polyoxyalkylene and fluorocarbon. The total content of these additives is preferably 0.001 to 10 wt % based on the primer.

(8) Composition of Primer

A description is subsequently given of the composition of the primer.

The polyester polyol comprises isophthalic acid in an amount of at least 50 mol %, preferably at least 51 mol %, based on the total of all acid components and has a hydroxyl group at the terminals of a polymer chain.

The isocyanate component and OH component are properly used in the composition ratio of NCO:OH of around 0.7:1 to 1.5:1, preferably 0.8:1 to 1.2:1.

The solid content of the primer is preferably 5 to 50 wt %, more preferably 10 to 40 wt %.

The thickness of the primer-cured layer is preferably 0.1 to 5 μm. When the thickness is smaller than 0.1 μm, the effect of improving the impact resistance of a coating film is small, while when the thickness is larger than 5 μm, the hardness of a hard coat lowers.

As for the curing conditions of the primer, the optimal conditions are selected from a curing temperature of 80 to 120° C. and a curing time of 10 to 120 minutes. When a blocked isocyanate is used, the curing conditions depend on the dissociation temperature of a blocking agent.

The primer may be suitably coated by dip coating, flow coating, spinner coating or spray coating.

(b) Plastic Lens Substrate

A plastic lens for spectacles having a refractive index of 1.48 or more is preferably used as a plastic lens substrate in the present invention. For example, a plastic lens made from a polyurethane resin, a plastic lens made from a methacrylic polymer, a plastic lens made from an acrylic polymer or a substrate made from a mixture thereof may be used.

(c) Hard-coat Layer

The plastic lens of the present invention can have a hard coat made from a silicon resin on a polyurethane primer-cured layer. The hard-coat layer is made from (A) fine particles of the oxide of at least one metal atom selected from the group consisting of Si, Al, Sn, Sb, Ta, Ce, La, Fe, Zn, W, Zr, In and Ti and having an average particle diameter of 1 to 100 nm and (B) the cured product of a composition for a hard coat comprising an epoxy group-containing silicon compound or a partially hydrolyzed product thereof.

The above components (A) and (B) and other component will be described hereinafter.

(1) Component (A)

The oxide of at least one metal atom selected from the group consisting of Si, Al, Sn, Sb, Ta, Ce, La, Fe, Zn, W, Zr, In and Ti is used. Stated more specifically, the oxide is a metal oxide selected from the group consisting of $SiO_2$, $Al_2O_3$, $SnO_2$, $Sb_2O_5$, $Ta_2O_5$, $CeO_2$, $La_2O_3$, $Fe_2O_3$, $ZnO$, $WO_3$, $ZrO_2$, $In_2O_3$ and $TiO_2$ or the oxide of two or more metals (composite oxide). The metal oxide is preferably in the form of fine particles having a particle diameter of 1 to 100 nm.

The amount of the metal oxide added is preferably 5 to 80 wt % in terms of the solid content of the composition for a hard coat.

Further, the oxide fine particles may be surface-modified with an organic silicon compound or amine to improve dispersibility into a solvent. The organic silane compound for surface modification is used in an amount of 0 to 30 wt %, preferably 1 to 25 wt % based on the weight of the fine particles. The surface modification may be carried out before or after a hydrolyzable group is hydrolyzed. The organic silicon compound used at this point is selected from compounds represented by the following formula (3):

$$R'_a R''_b SiX_{4-a-b} \quad (3)$$

wherein R' and R" are independently an organic group having an alkyl group, phenyl group, vinyl group, methacryloxy group, mercapto group, amino group or epoxy group, X is a hydrolyzable group, a is 0 or 1, and b is 0, 1 or 2.

These organic silicon compounds may be used alone or in combination of two or more.

Illustrative examples of the compound represented by the above formula (3) and having one X include trimethyl methoxysilane, triethyl methoxysilane, trimethyl ethoxysilane, triethyl ethoxysilane, triphenyl methoxysilane, diphenylmethyl methoxysilane, phenyldimethyl methoxysilane, phenyldimethyl ethoxysilane, vinyldimethyl methoxysilane, vinyldimethyl ethoxysilane, γ-acryloxypropyldimethyl methoxysilane, γ-methacryloxypropyldimethyl methoxysilane, γ-mercaptopropyldimethyl methoxysilane, γmercaptopropyldimethyl ethoxysilane, N-β(aminoethyl) γ-aminopropyldimethyl methoxysilane, γ-aminopropyldimethyl methoxysilane, γ-aminopropyldimethyl ethoxysilane, γ-glycidoxypropyldimethyl methoxysilane, γ-glycidoxypropyldimethoxy ethoxysilane and β-(3,4-epoxycyclohexyl)ethyldimethyl methoxysilane.

Illustrative examples of the compound represented by the above formula (3) and having 2 X's include dimethyl dimethoxysilane, diethyl dimethoxysilane, dimethyl diethoxysilane, diethyl diethoxysilane, diphenyl dimethoxysilane, phenylmethyl dimethoxysilane, phenylmethyl diethoxysilane, vinylmethyl dimethoxysilane, vinylmethyl diethoxysilane, γ-acryloxypropylmethyl dimethoxysilane, γ-methacryloxypropyldimethyl dimethoxysilane, γ-mercaptopropylmethyl dimethoxysilane, γ-mercaptopropylmethyl diethoxysilane, N-β(aminoethyl) γ-aminopropylmethyl dimethoxysilane, γ-aminopropylmethyl dimethoxysilane, γ-aminopropylmethyl diethoxysilane, γglycidoxypropylmethyl dimethoxysilane, γglycidoxypropylmethoxy diethoxysilane and β-(3.4-epoxycyclohexyl)ethylmethyl dimethoxysilane.

Illustrative examples of the compound represented by the above formula (3) and having 3 X's include methyl trimethoxysilane, ethyl trimethoxysilane, methyl triethoxysilane, ethyl triethoxysilane, phenyl trimethoxysilane, phenyl triethoxysilane, vinyl trimethoxysilane, vinyl triethoxysilane, vinyl(β-methoxyethoxy)silane, γ-acryloxypropyl trimethoxysilane, γ-methacryloxypropyl trimethoxysilane, γ-mercaptopropyl trimethoxysilane, γ-mercaptopropyl triethoxysilane, N-β (aminoethyl) γ-aminopropyl trimethoxysilane, γ-aminopropyl trimethoxysilane, γ-aminopropyl triethoxysilane, γ-glycidoxypropyl trimethoxysilane, β-glycidoxypropyl trimethoxysilane, γ-glycidoxypropyl triethoxysilane, β-glycidoxypropyl triethoxysilane and β-(3.4-epoxycyclohexyl)ethyl trimethoxysilane.

Illustrative examples of the compound represented by the above formula (3) and having 4 X's include tetraethyl orthosilicate and tetramethyl orthosilicate.

A dispersion medium for the above metal oxide is water, alcohol or other organic solvent, as exemplified by a saturated aliphatic alcohol such as methanol, ethanol, isopropyl alcohol, n-butanol and 2-butanol; a cellosolve such as methyl cellosolve, ethyl cellosolve, propyl cellosolve and butyl cellosolve; a propylene glycol derivative such as propylene glycol monomethyl ether, propylene glycol monoethyl ether and propylene glycol monomethyl acetate; ethylene glycol; an ester such as methyl acetate, ethyl acetate and butyl acetate; an ether such as diethyl ether and methyl isobutyl ether; a ketone such as tetrahydrofuran, acetone and methyl isobutyl ketone; an aromatic hydrocarbon such as xylene and toluene; N, N-dimethylformamide; dichloroethane; and the like.

(2) Component (B)

The epoxy group-containing silicon compound and the partially hydrolyzed product thereof as the component (B) are a compound represented by the following formula (4) and a partially hydrolyzed product thereof, respectively.

$$R^1R^2_aSi(OR^3)_{3-a} \quad (4)$$

wherein $R^1$ is a group containing an epoxy group having 2 to 12 carbon atoms, $R^2$ is an alkyl group having 1 to 6 carbon atoms, aryl group, alkenyl group, haloalkyl group or haloaryl group, $R^3$ is hydrogen atom, an alkyl group having 1 to 4 carbon atoms, acyl group or alkylacyl group, and a is an integer of 0, 1 or 2.

The epoxy group-containing silicon compound or the partially hydrolyzed product thereof as the component (B) is preferably used in the hard-coat composition in an amount of 5 to 90 wt % in terms of solid content.

Illustrative examples of the epoxy group-containing silicon compound of the above formula (4) include γglycidoxypropyl trimethoxysilane, β-glycidoxypropyl trimethoxysilane, γ-glycidoxypropyl triethoxysilane, βglycidoxypropyl triethoxysilane, γ-glycidoxypropylmethyl dimethoxysilane, γ-glycidoxypropylmethyl diethoxysilane, and β-(3.4-epoxycyclohexyl)ethyl trimethoxysilane.

Further, the third component having a functional group that can be chemically bonded to the component (A) or (B), may be added.

The third component is a component which can react with a silanol group after hydrolyzation and is used to adjust physical properties such as dyeability, heat resistance, water resistance, antistatic properties and surface hardness. The third component is at least one of the following compounds (C) to (O). The components (C) to (O) are used in an amount of 0.001 to 50 wt % in total, based on the total solid content of a base resin.

(3) Component (C)

The component (C) is an organic compound which has only one OH group or SH group in the molecule, contains at least one group selected from —O—, —CO—O—, —S—, —CO—S— and —CS—S— and at least one unsaturated group in the molecular main chain, and is soluble in water or a lower alcohol having 4 or less carbon atoms.

The above compound is preferably a compound represented by the following formula (5):

wherein $R^4$ is a monovalent hydrocarbon group having at least one unsaturated group and may contain an O or S atom, $R^5$ is a divalent hydrocarbon group having 2 or more carbon atoms and may contain an O or S atom, X is either an O or S atom, and Y is either an O atom or a S atom.

Illustrative examples of the compound of the above general formula (5) include polyethylene glycol monomethacrylate, poly(butanediol)monoacrylate, poly (butanediol)monomethacrylate, 1,4-butanediol monovinyl ether, 1,6-hexanedithiol monoacrylate, di(acryloxyethyl) hydroxyethylamine, 2-hydroxy-3-phenoxypropyl acrylate, pentaerythritol triacrylate, 2-hydroxybutyl acrylate, 3-acryloyloxyglycerine monomethacrylate, 2-hydroxy-1,3-dimethacryloxypropane and 2-mercaptoethyl acrylate.

The compound of the above formula (5) is preferably a compound represented by the following formula (6):

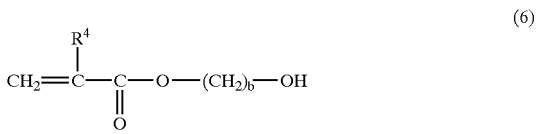

wherein $R^6$ is hydrogen atom or a methyl group, and b is an integer of 2 to 10, preferably 4 to 6, a compound represented by the following formula (7):

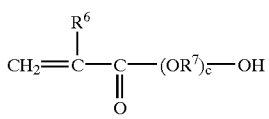  (7)

wherein $R^6$ is hydrogen atom or a methyl group, $R^7$ is —CH$_2$CH$_2$— or —CH$_2$CH(CH$_3$)—, and c is an integer of 2 to 9, preferably 2 to 4, a compound represented by the following formula (8):

$$CH_2=CH-(CH_2)_d-O-(CH_2)_b-OH \quad (8)$$

wherein b is an integer of 4 to 10, and d is 0 or 1, or a compound represented by the following formula (9):

$$CH_2=CH-(CH_2)_d-(OR^7)_c-OH \quad (9)$$

wherein $R^7$ is —CH$_2$CH$_2$— or —CH$_2$C(CH$_3$)H—, c is an integer of 2 to 9, and d is 0 or 1.

Illustrative examples of the compound of the formula (6) include 4-hydroxybutyl acrylate, 4-hydroxybutyl methacrylate and the like.

Illustrative examples of the compound of the formula (7) include diethylene glycol monoacrylate, tetraethylene glycol monoacrylate, polyethylene glycol monoacrylate, tripropylene glycol monoacrylate, polypropylene glycol monoacrylate, diethylene glycol monomethacrylate, tetraethylene glycol monomethacrylate, polyethylene glycol monomethacrylate, tripropylene glycol monomethacrylate, polypropylene glycol monomethacrylate and the like.

Illustrative examples of the compound of the formula (8) include 4-hydroxybutylallyl ether and 4-hydroxybutylvinyl ether.

Illustrative examples of the compound of the formula (9) include diethylene glycol monoallyl ether and triethylene glycol monovinyl ether.

(4) Component (D)

The component (D) is an unsaturated dibasic acid. Illustrative examples of the component (D) include itaconic acid, succinic acid, malonic acid, glutaric acid, adipic acid, pimelic acid, suberic acid, azelaic acid, sebacic acid, fumaric acid and maleic acid.

(5) Component (E)

The component (E) is a cyclic anhydride of an unsaturated dibasic acid. Illustrative examples of the component (E) include succinic anhydride, glutaric anhydride, trimellitic anhydride, pyromellitic anhydride, fumaric anhydride and maleic anhydride.

(6) The component (F) is an imide compound of an unsaturated dibasic acid. Illustrative examples of the component (F) include succinic acid imide, glutaric acid imide, phthalic acid imide and maleic acid imide.

(7) The component (G) is a saturated polycarboxylic acid. Illustrative examples of the component (G) include adipic acid and suberic acid.

(8) The component (H) is a cyclic anhydride of a saturated polycarboxylic acid. Illustrative examples of the component (H) include cyclic anhydrides of saturated polycarboxylic acids as the component (G).

(9) The component (I) is an imide compound of a saturated polycarboxylic acid. Illustrative examples of the component (I) include imide compounds of saturated polycarboxylic acids as the component (G).

(10) The component (J) is an amine. Illustrative examples of the amine include polymethylene diamine, polyether diamine, diethylene triamine, iminobispropylamine, bishexamethylene triamine, diethylene triamine, tetraethylene pentaamine, pentaethylene hexamine, dimethylaminopropylamine, aminoethylethanolamine, methyliminobispropylamine, menthane diamine, N-aminomethylpiperazine, 1,3-diaminocyclohexane, isophorone diamine, metaxylene diamine, tetrachloroparaxylene diamine, methaphenilene diamine, 4,4'-methylenedianiline, diaminodiphenylsulfone, benzidine, toluidine, diaminodiphenyl ether, 4,4'-thiodianiline, 4,4'-bis(o-toluidine)dianisidine, o-phenylenediamine, 2,4-toluenediamine, methylenebis(o-chloroaniline), diaminiditrissulfone, bis(3,4-diaminophenyl)sulfone, 2,6-diaminopyridine, 4-chloro-o-phenylenediamine, 4-methoxy-6-methyl-m-phenylenediamine, m-aminobenzylamine, N,N,N',N'-tetramethyl-1,3-butanediamine, N,N,N',N'-tetramethyl-p-phenylenediamine, tetramethylguanidine, triethanolamine, 2-dimethylamino-2-hydroxypropane, N,N'-dimethylpiperazine, N,N'-bis[(2-hydroxy)propyl]piperazine, N-methylmorpholine, hexamethylenetetramine, pyridine, pyrazine, quinoline, benzyldimethylamine, α-methylbenzylmethylamine, 2-(dimethylaminomethyl)phenol, 2,4,6-tris(dimethylaminomethylol)phenol, N-methylpiperazine, pyrrolidine, morpholine and the like.

In addition to these, adducts and condensates of the above amines with an organic carboxylic acid, cyclic ether, ketone, aldehyde, hydroquinone and the like may be used likewise.

(11) The component (K) is urea or an adduct thereof with formaldehyde.

(12) The component (L) is an alkyl-substituted methylol melamine.

(13) The component (M) is a compound having 2 or more OH groups or SH groups.

Illustrative examples of the component (M) include 1,4-butanediol, 1,6-hexanediol, 1,9-nonanediol, 1,10-decanediol, ethylene glycol, diethylene glycol, triethylene glycol, tetraethylene glycol, polyethylene glycol, propylene glycol, tripropylene glycol, polypropylene glycol, trimethylol propane, neopentyl glycol, catechol, resorcinol, alkylene glycol and polyvinyl alcohol.

(14) The component (N) is a compound having 2 or more epoxy groups. Illustrative examples thereof are glycidyl ethers of polyhydric alcohols as the component (M).

(15) The component (O) is a dicyandiamide, hydrazide, thiourea, guanidine, ethyleneimine, sulfoneamide or a derivative thereof.

(16) The component (P) is an organic silicon compound represented by the following formula (10):

$$R^6{}_d R^2{}_e Si\,(OR^3)_{4-d-e} \quad (10)$$

wherein $R^2$ and $R^3$ are the same as defined in the above formula (4), $R^6$ is selected from an alkyl group having 1 to 4 carbon atoms, haloalkyl group, aryl group or haloaryl group having 6 to 12 carbon atoms, methacryloxyalkyl group having 5 to 8 carbon atoms, ureidoalkylene group having 2 to 10 carbon atoms, aromatic ureidoalkylene group, aromatic alkylene halide group and mercaptoalkylene group, d is 1, 2 or 3, and e is 0, 1 or 2, or a partially hydrolyzed product thereof. The component (P) is used in an amount of 0 to 100 parts by weight in terms of solid content based on 100 parts by weight of the total solid content of a base resin.

Illustrative examples of the compound of the above formula (10) include trimethyl methoxysilane, triethyl methoxysilane, trimethyl ethoxysilane, triethyl ethoxysilane, triphenyl methoxysilane, diphenylmethyl methoxysilane, phenyldimethyl methoxysilane, phenyldimethyl ethoxysilane, vinyldimethyl methoxysilane, vinyldimethyl ethoxysilane, vinyl(β-methoxyethoxy)silane, γ-acryloxypropyldimethyl methoxysilane, γ-methacryloxypropyldimethyl methoxysilane, γ-mercaptopropyldimethyl ethoxysilane, N-β(aminoethyl) γ-aminopropyldimethyl methoxysilane, γ-aminopropyldimethyl methoxysilane, γ-aminopropyldimethyl ethoxysilane, γ-glycidoxypropyldimethyl methoxysilane, γ-glycidoxypropyldimethoxy ethoxysilane, γ-(3.4-epoxycyclohexyl)ethyldimethyl methoxysilane, dimethyl dimethoxysilane, diethyl dimethoxysilane, dimethyl diethoxysilane, diethyl diethoxysilane, diphenyl dimethoxysilane, phenylmethyl dimethoxysilane, phenylmethyl diethoxysilane, vinylmethyl dimethoxysilane, vinylmethyl diethoxysilane, γ-acryloxypropylmethyl dimethoxysilane, γ-methacryloxypropyldimethyl dimethoxysilane, γ-mercaptopropylmethyl dimethoxysilane, γ-mercaptopropylmethyl diethoxysilane, N-β(aminoethyl) γ-aminopropylmethyl dimethoxysilane, γ-aminopropylmethyl dimethoxysilane, γ-aminopropylmethyl diethoxysilane, γ-glycidoxypropylmethyl dimethoxysilane, γ-glycidoxypropylmethoxy diethoxysilane, β-(3.4-epoxycyclohexyl)ethylmethyl dimethoxysilane, methyl trimethoxysilane, ethyl trimethoxysilane, methyl triethoxysilane, ethyl triethoxysilane, phenyl trimethoxysilane, phenyl triethoxysilane, vinyl trimethoxysilane, vinyl triethoxysilane, vinyl(β-methoxyethoxy)silane, γ-acryloxypropyl trimethoxysilane, γ-methacryloxypropyl trimethoxysilane, γ-mercaptopropyl trimethoxysilane, γ-mercaptopropyl triethoxysilane, N-β (aminoethyl)γ-aminopropyl trimethoxysilane, γ-aminopropyl trimethoxysilane, γ-aminopropyl triethoxysilane, γ-glycidoxypropyl trimethoxysilane, β-glycidoxypropyl trimethoxysilane, γ-glycidoxypropyl triethoxysilane, β-glycidoxypropyl triethoxysilane, β-(3.4-epoxycyclohexyl)ethyl trimethoxysilane, tetraethyl orthosilicate, tetramethyl orthosilicate and the like.

A curing catalyst for the hard-coat composition is selected, for example, from a metal salt of ethyl acetoacetate, a metal salt coordinately bonded by acetylacetone and ethyl acetoacetate, an alkali metal salt and ammonium salt of a carboxylic acid, a metal salt and ammonium salt of acetylacetone, a metal salt hydrate of ethylenediamine, primary to tertiary amines, polyalkylene amine, sulfonate, magnesium perchlorate, ammonium perchlorate, and combinations of these compounds and organic mercaptan or mercaptoalkylenesilane.

The curing catalyst may be used at the time of preparation of the hard-coat composition or right before the hard-coat composition is coated.

The curing catalyst may be used in the hard-coat composition in an amount of 0.01 to 20 wt % in terms of solid content.

A solvent for the hard-coat composition is selected, for example, from saturated aliphatic alcohols such as methanol, ethanol, isopropyl alcohol, n-butanol and 2-butanol; cellosolves such as methyl cellosolve, ethyl cellosolve, propyl cellosolve and butyl cellosolve; propylene glycol derivatives such as propylene glycol monomethyl ether, propylene glycol monoethyl ether and propylene glycol monomethyl acetate; esters such as ethylene glycol, methyl acetate, ethyl acetate and butyl acetate; ethers such as diethyl ether and methyl isobutyl ether; ketones such as tetrahydrofuran, acetone and methyl isobutyl ketone; aromatic hydrocarbons such as xylene and toluene; N,N-dimethylformamide; dichloroethane; and the like. Water may be added as required, and an acid such as acetic acid and the like may be added to hydrolyze a silane.

The hard-coat composition may further contain a leveling agent for a cured coating film, antioxidant, weather-providing agent, antistatic agent, colorant and dye. Of these, the leveling agent is a copolymer of polyoxyalkylene and polydimethylsiloxane or a copolymer of polyoxyalkylene and fluorocarbon, for example. The leveling agent may be added to the hard-coat composition in an amount of 0.001 to 10 parts by weight in terms of solid content.

The thickness of the hard-coat layer is preferably 0.4 to 8 $\mu$m. When the thickness is smaller than 0.4 $\mu$m, hardness is liable to lower, while when the thickness is larger than 8 $\mu$m, the hard-coat layer is liable to crack.

The curing conditions consist of a curing temperature of 90 to 120° C. and a curing time of several hours to 30 minutes. It is preferred that optimal conditions are selected from these ranges.

The hard-coat composition may be coated by dip coating, flow coating, spinner coating or spray coating.

(c) Anti-reflection Coating

An anti-reflection layer consisting of a single-layer or multi-layer inorganic material may be formed on the hard-coat film. The reduction of reflection and the improvement of transmission and weatherability can be attained by forming the anti-reflection layer.

A thin film is formed by vapor deposition using $SiO$, $SiO_2$, $Si_3N_4$, $TiO_2$, $ZrO_2$, $Al_2O_3$, $MgF_2$, $Ta_2O_5$ or the like as the inorganic material.

(d) Pretreatment

In order to improve the adhesion of the hard coat, it is effective to subject a lens having a primer-cured layer to a pretreatment such as an alkali treatment, acid treatment, plasma treatment, corona treatment, flame treatment or UV-irradiation treatment.

The plastic lens of the present invention is particularly suitable for use as a plastic lens for spectacles, for example, safety spectacles which must be impact-resistant. It may also be used for a transparent plastic sheet which is required to have impact resistance.

The primer layer in the present invention improves the impact resistance of a plastic lens at various temperature ranges experienced in a daily life compared with the primer layer of the prior art made from an urethane resin obtained from a polyester polyol comprising adipic acid as a main component. The primer layer provides impact resistance which does not lower at high temperatures in particular, and practically sufficient impact resistance to an HI lens substrate which is slightly inferior in impact resistance.

EXAMPLES

The examples of the present invention will be described hereinafter.

The lens substrate and primer used, a method for coating the hard-coat composition and a performance test for the obtained coating film will be described hereinafter.

(a) Plastic Lens Substrate Includes

A: plastic lens made from diethylene glycol bisallyl carbonate having a refractive index of 1.50

B: plastic lens made from a thiourethane resin having a refractive index of 1.594 (obtained by thermally curing the MR-90 monomer of Mitsui Chemicals, Inc.)

C: plastic lens made from a thiourethane resin having a refractive index of 1.66 (obtained by thermally curing the MR-7 monomer of Mitsui Chemicals, Inc.)

(b) Method for Coating Primer

The lens substrate is dipped in each coating solution and lifted at a lifting rate of 10 cm/min to carry out the dip coating of the primer on the lens substrate, and the primer layer is dried at room temperature for about 10 minutes and thermally cured at 95° C. for 30 minutes.

(c) Method for Coating Hard-coat Solution

The lens having a primer-cured layer is dipped in each coating solution and lifted at a lifting rate of 15 cm/min to carry out the dip coating of the hard-coat solution on the primer-cured layer, and the hard-coat layer is dried at room temperature for about 5 minutes and thermally cured at 120° C. for 1 hour.

(d) A cross-hatch test or a cross-cut adhesion test is carried out in accordance with JIS K5400.

(e) Steel Wool Test

The lens is rubbed using Steel wool #0000 with a 1-kg load, and scratches formed are judged based on the following criteria.

5: The lens is not scratched at all.
4: The lens is slightly scratched.
3: The lens is scratched.
2: The lens is heavily scratched.
1: The lens is scratched to the depth of its substrate.

(f) Dyeability

An aqueous solution prepared by diluting the BPI GRAY of Brain Power Inc. (USA) with distilled water to a concentration of 9% is heated at 90° C., and a lens coated with each coating solution is immersed in this aqueous solution for 5 minutes, taken out and washed with water. The total light transmittance of the lens after dyeing is measured to compare dyeability.

(g) Measurement of Film Thickness

The glass sheet is coated with each coating solution. After the coating film is cured, part thereof is cut out, and a film thickness is obtained from difference in level.

(h) Impact Resistance

A destructive test is carried out in accordance with ANSI Z80.1 by causing a 16.32-g steel ball to strike against a convex surface of a lens. An intermediate value between an amount of impact energy when the lens is broken or cracked and an amount of maximum impact energy when there is no change in the lens is regarded as the impact resistance and it is expressed by a multiple of an FDA standard value (0.2 J). The lens substrate used is a plastic lens of a negative degree having a center thickness of 1.0 to 1.3 mm.

Before measurement, the coated lenses are left in an atmosphere of 0° C., 20° C., 30° C. and 40° C. for 24 hours, respectively, and a falling ball test is quickly carried out at 20° C.

(i) Weatherability

The outer appearance and adhesion of a lens after 240 hours of exposure are evaluated in accordance with ASTM G-26 using a xenon weatherometer.

(a) Preparation of Primer (1) Primer No. 1

91 Grams of a polyester polyol comprising isophthalic acid and 1,6-hexanediol and having an average molecular weight of 940 and an OH value of 120 mgKOH/g, 92 g of a butyl acetate solution containing 75% of a 1,6-hexanediol diisocyanate trimer blocked by β-diketone and 812 g of propylene glycol monomethyl ether were mixed together and stirred until a homogenous mixture was obtained, and 0.5 g of the Florad FC-430 of 3M Corp. was added as a leveling agent and stirred to prepare a primer No. 1.

(2) Primer No. 2

61 Grams of a polyester polyol comprising isophthalic acid and adipic acid in a molar ratio of 60:40 and 1,6-hexanediol and trimethylol propane and having an average molecular weight of 650 and a hydroxyl number of 260 mgKOH/g, 135 g of a butyl acetate solution containing 75% of a 1,6-hexanediol diisocyanate trimer blocked by β-diketone and 802 g of propylene glycol monomethyl ether were mixed together and stirred until a homogeneous mixture was obtained, and 0.5 g of the Florad FC-430 of 3M Corp. was added as a leveling agent and stirred to prepare a primer No. 2.

(3) Primer No. 3

700 Grams of the primer No. 1 prepared separately from (1) above was weighed and stirred. 140 Grams of propylene glycol monomethyl ether and then 160 g of a composite oxide sol No. 1 of $TiO_2$, $Fe_2O_3$ and $SiO_2$ (dispersed in methanol, an average particle diameter of 10 nm, a nonvolatile content of 30%) were added to the primer and stirred to a homogeneous state to prepare a primer No. 3.

(4) Primer No. 4

500 Grams of the primer No. 1 prepared separately from (1) above was weighed and stirred. 234 Grams of propylene glycol monomethyl ether and then 266 g of a composite oxide sol No. 2 of $TiO_2$, $ZrO_2$ and $SiO_2$ (dispersed in methanol, an average particle diameter of 10 nm, a nonvolatile content of 30%) were added to the primer and stirred to a homogeneous state to prepare a primer No. 4.

(5) Primer No. 5

66 Grams of a polyester polyol comprising adipic acid and methylpentanediol and having an average molecular weight of 500 and a hydroxyl number of 224 mgKOH/g, 125 g of a butyl acetate solution containing 75% of a 1,6-hexanediol diisocyanate trimer blocked by β-diketone and 804 g of propylene glycol monomethyl ether were mixed together and stirred until a homogeneous mixture was obtained, and 0.5 g of the Florad FC-430 of 3M Corp. was added as a leveling agent and stirred to prepare a primer No. 5.

(6) Primer No. 6

700 Grams of the primer No. 5 prepared separately from (5) above was weighed and stirred. 140 Grams of propylene glycol monomethyl ether and then 160 g of the above composite oxide sol No. 1 were added to the primer and stirred to a homogeneous state to prepare a primer No. 6.

(7) Primer No. 7

500 Grams of the primer No. 5 prepared separately from (5) above was weighed and stirred. 234 Grams of propylene glycol monomethyl ether and then 266 g of the above composite oxide sol No. 2 were added to the primer and stirred to a homogeneous state to prepare a primer No. 7.

(b) Preparation of Hard-coat Solution (a) Hard-coat Solution No. 1

306 Grams of an acidic water-dispersion sol of $SiO_2$ (an average particle diameter of 10 nm, a nonvolatile content of 40%) was weighed and collected. 104 Grams of γ-glycidoxypropyl trimethoxysilane and 99 g of methyl trimethoxysilane were gradually added to the sol. After addition, the mixture solution was stirred for another 2 hours. Thereafter, 435 g of isopropyl alcohol was added and then 25 g of itaconic acid was added while the mixture solution was stirred. Further, 0.8 g of ammonium perchlorate as a curing catalyst and 0.4 g of a silicone surfactant (a product of Nippon Unicar Co., Ltd.; trade name: L-7001) as a leveling agent were added, and the mixture solution was stirred for 1 hour. The above mixture solution was aged at room temperature for 48 hours to obtain a hard-coat solution No. 1.

(2) Hard-coat Solution No. 2

330 Grams of the above composite oxide sol No. 1 was weighed and collected. 150 Grams of distilled water was added thereto under agitation. 182 Grams of γ-glycidoxypropyl trimethoxysilane and 65 g of methyl trimethoxysilane were gradually added. After addition, the mixture solution was stirred for another 2 hours. Thereafter, then the hard-coat solutions Nos. 1 to 3 were coated on the resulting lens matrices and cured by heating at 120° C. for 30 minutes. The evaluation results of the performance of the obtained coated lenses are shown in the column "hard coat" of Table 1.

Four anti-reflection layers of $ZrO_2$, $SiO_2$, $ZrO_2$ and $SiO_2$ were formed on the above hard-coat layers by vacuum vapor deposition, respectively. The thickness of the formed anti-reflection layers were about $\lambda/12$, $\lambda/12$, $\lambda/2$ and $\lambda/4$, respectively. The evaluation results of the obtained lenses are shown in the column "anti-reflection coat" of Table 1.

TABLE 1

|  |  | lens substrate | primer |  | hard coat |  |  |  |  | anti-reflection coat |  |
|---|---|---|---|---|---|---|---|---|---|---|---|
|  |  |  | No | film thickness | No | film thickness | appearance | adhesion | SW hardness | dyeability | adhesion | weather ability |
| Ex. | 1 | A | 1 | 1.2 | 1 | 2.0 | good | 100% | 4 | 30% | 100% | good |
|  | 2 | A | 2 | 1.2 | 1 | 2.0 | good | 100% | 4 | 30% | 100% | good |
|  | 3 | B | 3 | 1.1 | 2 | 1.5 | good | 100% | 4 | 40% | 100% | good |
|  | 4 | C | 4 | 1.1 | 3 | 1.5 | good | 100% | 4 | 40% | 100% | good |
| C. Ex. | 1 | A | 5 | 1.2 | 1 | 2.0 | good | 100% | 4 | 30% | 100% | good |
|  | 2 | B | 6 | 1.1 | 2 | 1.5 | good | 100% | 4 | 40% | 100% | good |
|  | 3 | C | 7 | 1.1 | 3 | 1.5 | good | 100% | 4 | 40% | 100% | good |

Ex.: Example, C. Ex: Comparative Example
Unit of film thickness: μm 227 g of isopropyl alcohol and then 40 g of tetraethylene glycol monomethacrylate were added while the mixture solution was stirred. Further, 6 g of acetylacetone aluminum as a curing catalyst and 0.4 g of a silicone surfactant (a product of Nippon Unicar Co., Ltd.; trade name: L-7001) as a leveling agent were added, and the mixture solution was stirred for 1 hour. The above mixture solution was aged at room temperature for 48 hours to obtain a hard-coat solution No. 2.

(3) Hard-coat Solution No. 3

A hard-coat solution No. 3 was obtained in the same manner as in (2) above except that 433 g of the above composite oxide sol No. 2 (hard-coat solution No. 2), 184 g of γ-glycidoxypropyl trimethoxysilane and 216 g of isopropyl alcohol were used.

(c) Production of Coated Lenses (1) Examples 1 to 4

The primer solutions Nos. 1 to 4 were coated on lens matrices and cured by heating at 90° C. for 30 minutes, and then the hard-coat solutions Nos. 1 to 3 were coated on the resulting lens matrices and cured by heating at 120° C. for 60 minutes. The evaluation results of the performance of the obtained coated lenses are shown in the column "hard coat" of Table 1.

Four anti-reflection layers of $ZrO_2$, $SiO_2$, $ZrO_2$ and $SiO_2$ were formed on the above hard-coat layers by vacuum vapor deposition, respectively. The thickness of the formed anti-reflection layers was about $\lambda/12$, $\lambda/12$, $\lambda/2$ and $\lambda/4$, respectively. $\lambda$ is the light wavelength of 520 nm. The evaluation results of the obtained lenses are shown in the column "anti-reflection coat" of Table 1.

(2) Comparative Examples 1 to 3

The primer solutions Nos. 5 to 7 were coated on lens matrices and cured by heating at 90° C. for 30 minutes, and The plastic lenses having anti-reflection layers and hard-coat layers of Examples 1 to 4 and Comparative Examples 1 to 3 were measured for their impact resistance. The results are shown in Table 2.

TABLE 2

|  |  | lens substrate | 0° C. | 20° C. | 30° C. | 40° C. |
|---|---|---|---|---|---|---|
| Ex. | 1 | A | 12 times | 11 times | 12 times | 12 times |
|  | 2 | A | 12 times | 10 times | 11 times | 11 times |
|  | 3 | B | 5 times | 5 times | 5 times | 5 times |
|  | 4 | C | 7 times | 7 times | 7 times | 7 times |
| C.Ex. | 1 | A | 12 times | 9 times | 6 times | 5 times |
|  | 2 | B | 5 times | 4 times | 3 times | 2 times |
|  | 3 | C | 6 times | 6 times | 4 times | 3 times |

The impact resistance of the lenses, produced by coating and curing a primer made from a polyester polyol comprising isophthalic acid, of Examples 1 to 4 did not lower at high temperatures, whereas the impact resistance of the lenses, produced by coating and curing a primer made from a polyester polyol comprising adipic acid, of Comparative Examples 1 to 3 lowered, at high temperatures in particular.

What is claimed is:

1. A plastic lens having a plastic lens substrate, a polyurethane layer formed on at least one side of the substrate and a silicon resin hard coat layer on the polyurethane layer, said polyurethane layer being a cured product of a primer comprising a polyol which consists essentially of a polyester polyol, said polyester polyol containing, as an acid component, isophthalic acid in an amount of 50 to 100 mol % based on the total of all acid components and other dicarboxylic acid in an amount of 0 to 50 mol % based on the total of all acid components, and a polyisocyanate.

2. The plastic lens of claim 1, wherein the polyisocyanate is at least one member selected from the group consisting of a monomer, isocyanurate, adduct, allophanate, carbodiimide and prepolymer of a polyisocyanate having a saturated aliphatic skeleton.

3. The plastic lens of claim 1, wherein the polyisocyanate is an isocyanurate of hexamethylene diisocyanate, and the isocyanate group thereof is blocked by at least one compound selected from the group consisting of β-diketone, diethyl malonate, dimethyl malonate, acetoxime and butanone oxime.

4. The plastic lens of claim 1, wherein the polyisocyanate is at least one member selected from the group consisting of a monomer, isocyanurate, adduct, allophanate, carbodiimide and prepolymer of a polyisocyanate having an aromatic ring skeleton.

5. The plastic lens of claim 1, wherein the polyisocyanate is xylylene diisocyanate or tetramethylxylylene diisocyanate, and the isocyanate group thereof is blocked by at least one compound selected from the group consisting of β-diketone, diethyl malonate, dimethyl malonate, acetoxime and butanone oxime.

6. The plastic lens of claim 1, wherein the primer further comprises fine particles having an average particle diameter of 1 to 100 nm which are made from an oxide of at least one metal atom selected from the group consisting of Si, Al, Sn, Sb, Ta, Ce, La, Fe, Zn, W, Zr, In and Ti in an amount of 70 wt. % or less in terms of solid content.

7. The plastic lens of claim 1, wherein the hard-coat layer contains fine particles having an average particle diameter of 1 to 100 nm which are made from an oxide of at least one metal atom selected from the group consisting of Si, Al, Sn, Sb, Ta, Ce, La, Fe, Zn, W, Zr, In and Ti.

8. The plastic lens of claim 1, wherein the silicon resin of the hard-coat layer is an epoxy-containing silicon compound represented by the following formula (3) or a hydrolyzed product thereof:

(3)

wherein $R^1$ is an organic group containing an epoxy group and having 2 to 12 carbon atoms, $R^2$ is an alkyl group having 1 to 6 carbon atoms, alkenyl group, haloalkyl group, aryl group or haloaryl group, $R^3$ is hydrogen atom, an alkyl group having 1 to 4 carbon atoms or acyl group, and a is 0, 1 or 2.

9. The plastic lens of claim 1, wherein the hard-coat layer contains (A) fine particles having an average particle diameter of 1 to 100 nm which are made from an oxide of at least one metal atom selected from the group consisting of Si, Al, Sn, Sb, Ta, Ce, La, Fe, Zn, W, Zr, In and Ti, (B) an epoxy-containing silicon compound represented by the following formula (3) or a hydrolyzed product thereof:

(3)

wherein $R^1$ is an organic group containing an epoxy group and having 2 to 12 carbon atoms, $R^2$ is an alkyl group having 1 to 6 carbon atoms, alkenyl group, haloalkyl group, aryl group or haloaryl group, $R^3$ is hydrogen atom, an alkyl group having 1 to 4 carbon atoms or acyl group, and a is 0, 1 or 2, and a third component having a functional group that can be chemically bonded to the components (A) and (B).

10. The plastic lens of claim 9, wherein the third component is at least one compound selected from the group consisting of components (C) to (O):

(C) an organic compound which has only one OH group or SH group in the molecule, contains at least one group selected from the group consisting of —O—, —CO—O—, —S—, —CO—S— and —CS—S— and at least one unsaturated group in the molecular main chain, and is soluble in water or an alcohol having 4 or less carbon atoms, (D) an unsaturated dibasic acid, (E) a cyclic anhydride of an unsaturated dibasic acid, (F) an imide compound of an unsaturated dibasic acid, (G) a saturated pblycarboxylic acid (H) a cyclic anhydride of a saturated polycarboxylic acid (I) an imide compound of a saturated polycarboxylic acid, (J) an amine, (K) urea and an adduct thereof with formaldehyde, (L) alkyl-substituted methylol melamine (M) a compound having 2 or more OH groups or SH groups, (N) a compound having 2 or more epoxy groups, and (O) dicyandiamide, hydrazide, thiourea, guanidine, ethyleneimine, sulfoneamide and derivatives thereof.

11. A plastic lens having an anti-reflection layer on the hard-coat layer of the plastic lens of claim 1.

12. The plastic lens of claim 1, wherein the isocyanate groups of the polyisocyanate are blocked.

13. The plastic lens of claim 1, wherein the polyisocyanate is an isocyanurate of isophorone diisocyanate, and the isocyanate group thereof is blocked by at lest one compound selected from the group consisting of β-diketone, diethyl malonate, dimethyl malonate, acetoxime and butanone oxide.

14. The plastic lens of claim 1, wherein the other dicarboxylic acid which is contained in an amount of 0 to 50 mol % is at least one dicarboxylic acid selected from the group consisting of phthalic acid, terephthalic acid, phthalic anhydride, hydrogenated phthalic acid, fumaric acid, dimerized linoleic acid, maleic acid and saturated aliphatic dicarboxylic acids having 4 to 8 carbon atoms.

15. The plastic lens of claim 1, wherein the polyester polyol contains, as a diol component for being reacted with the said acid component to form the polyester polyol, at least one diol selected from the group consisting of diols represented by the following formula (2):

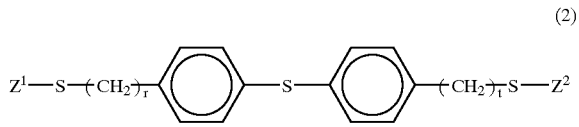

(2)

wherein $Z^1$ and $Z^2$ are independently an organic group having one OH group and comprising a carbon atom, hydrogen atom and oxygen atom, and r and t are independently 0 or 1.

* * * * *